(Model.)
R. V. WICKS.
CHAMFERING PLANE.
No. 310,349.
Patented Jan. 6, 1885.
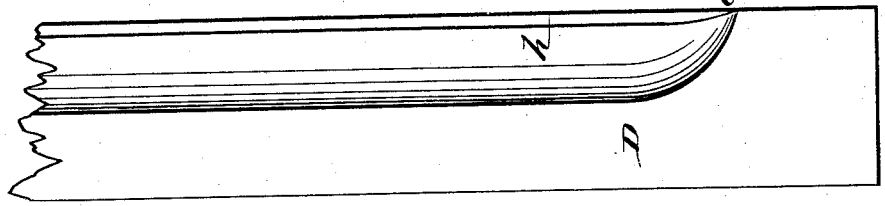
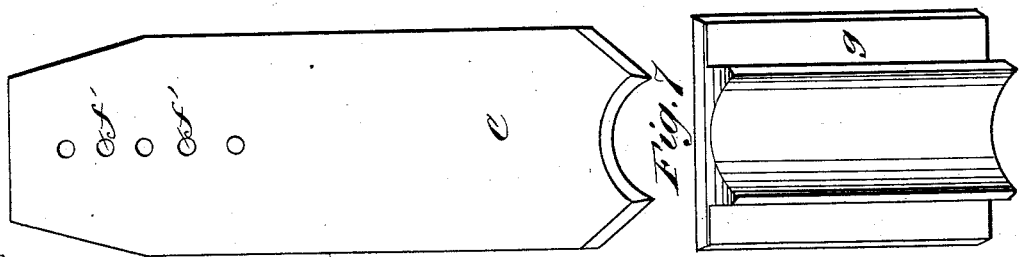
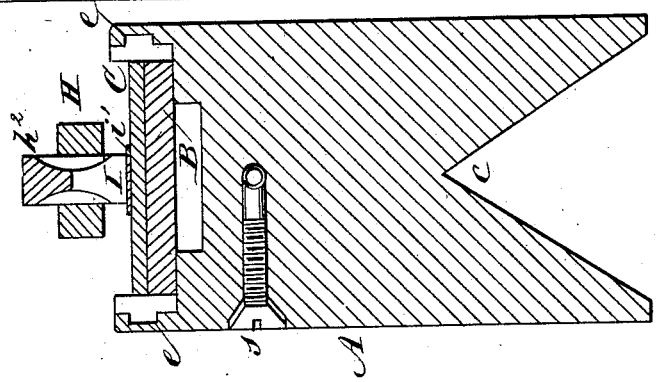
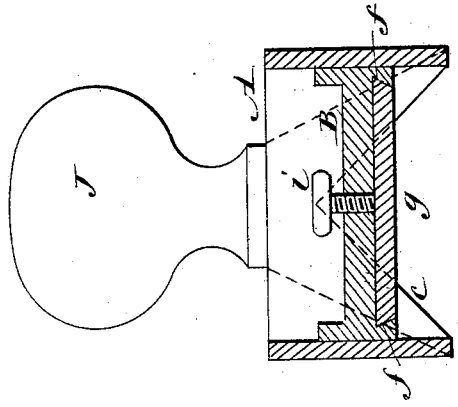
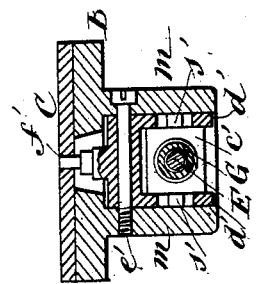
WITNESSES:
C. Neveux
C. Sedgwick
INVENTOR:
R. V. Wicks
BY Munn & Co
ATTORNEYS.

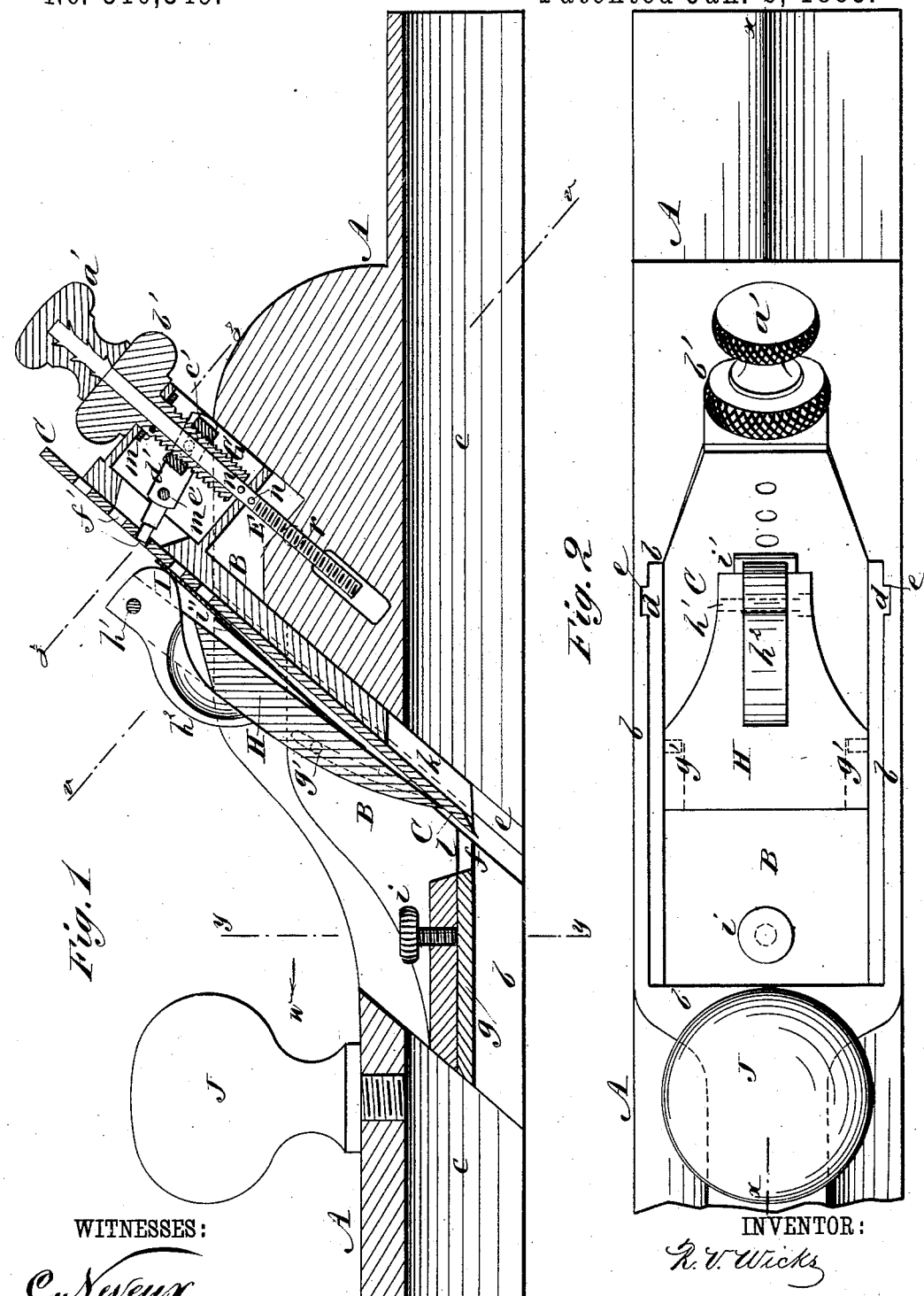

UNITED STATES PATENT OFFICE.

RICHARD VANWIKE WICKS, OF BROOKLYN, NEW YORK.

CHAMFERING-PLANE.

SPECIFICATION forming part of Letters Patent No. 310,349, dated January 6, 1885.

Application filed April 29, 1884. (Model.)

*To all whom it may concern:*

Be it known that I, RICHARD VANWIKE WICKS, of Brooklyn, in the county of Kings and State of New York, have invented certain new and useful Improvements in Chamfering and other Planes, of which the following is a full, clear, and exact description.

This invention has for its object the production of a plane to be used by carpenters and others for making "stop" chamfers, rule-joint and other moldings—that is, chamfers or moldings which are required to stop short of the whole length of the work or piece of wood to be dressed—as, for instance, when required to form a square base on the end of a frame or other piece of timber. To do this kind of stop-work, planes of special construction for cutting stop-chamfers have before been designed and used; but they essentially differ from the plane hereinafter described, and it generally has been and still is customary to cut away with the chisel the wood at a distance from where the chamfer or molding is required to be stopped, and then to work an ordinary chamfering or molding plane up to such cut portion, and afterward to dress or finish with the chisel, sand-paper, or otherwise. This is not only tedious, but expensive, on account of the labor involved, especially where a large amount of such work has to be done. My improved plane effectually accomplishes the work, without any such chiseling or cutting away, by the simple or direct act of running or passing the plane over the work. The invention comprises a peculiarly-constructed stock having an enlarged oblique opening down through it for the introduction of a guide corresponding with the shape of the chamfer or molding, and the cutter also having a longitudinal groove in its base corresponding in transverse section with the angular edge of the wood before the chamfering or molding guide and cutter are passed over it, and which groove is of a depth in rear of the cutter to receive the part not designed to be dressed by the cutter up within it. It likewise comprises various details of construction for separately adjusting the guide and cutter, for clamping or holding and releasing the knife or cutter, and for otherwise providing for the general and special action of the tool, substantially as hereinafter described.

Reference is to be had to the accompanying drawings, forming part of this specification, in which similar letters of reference indicate corresponding parts in all the figures.

Figure 1 represents a longitudinal vertical section on the line $x$ $x$ in Fig. 2 of a plane embodying my invention. Fig. 2 is a plan of the same; Fig. 3, a transverse section on the line $y$ $y$ in Fig. 1, looking in direction of the arrow $w$; Fig. 4, a section on the irregular line $z$ $z$ in Fig. 1, and Fig. 5 a section on the line $v$ $v$ in Fig. 1. Fig. 6 is a face view of a knife or cutter for making a stop rule-joint form of molding instead of a plain or flat chamfer, as provided for by the cutter and guide shown more particularly in Figs. 1 and 3; Fig. 7, a face view of a guide-plate adapted to the rule-joint cutter, and Fig. 8 a longitudinal view of a piece of rule-joint work as produced by the use in the tool of the cutter and guide shown in Figs. 6 and 7.

A indicates the stock of the plane, made either of iron or wood, but preferably metal, with an enlarged oblique opening, $b$, up through it, inclining forwardly in a downward direction. The base of said stock is constructed to form or leave an enlarged angular (preferably right-angular) recess or groove, $c$, centrally up within it throughout its length, the same corresponding in transverse section with the angular adjacent longitudinal marginal portions of the piece of wood to be chamfered or molded before said portions are so reduced or fashioned.

B is a guide or shoe adjustable up and down within the oblique opening $b$ in the stock, and which may be directed in its movement by correspondingly inclined or oblique ribs $d$ $d$, working in grooves $e$ $e$ in the side walls of the opening $b$. The lower face of this guide or shoe is flat or straight and parallel with the lower side margins of the stock, and is dovetailed, as at $f f$, to receive within and along it a face piece or plate, $g$, shaped on its under surface to accord with the configuration of the chamfer or molding to be made. In Figs. 1 and 3 it is represented as flat on its face, and the knife or cutter C, which is arranged in the rear of it, is straight on its cutting-edge to correspond, for the purpose of making a flat or plain stop-chamfer on the adjacent marginal longitudinal portions of the piece of wood to be worked, while in Figs. 6 and 7 the under surface of the face-piece $g$ and the acting edge of the cutter C are shaped to produce a stop rule-joint molding, $h$, (see Fig. 8,) on the wood D to be worked. Other shaped moldings will require different guiding face plates or pieces and cutters. When attached, the face-piece $g$ becomes a portion of the guide B, and it may be held from moving by a set-screw, $i$. By making it removable, however, as likewise the cutter, which is also carried by said guide, the same guide or shoe B may be used in connection with different face pieces or plates and cutters, according to the shape of molding required. The knife or cutter C is passed down within the guide B against its inclined back, which should be cut away below, as at $k$, so as not to interfere with or project down into the longitudinal groove $b$ in the bottom of the stock. The cutting edge of the knife, when the latter is adjusted for work, projects any desired distance below the under surface of the guiding-plate $g$, according to the thickness of the shaving to be made, and stands at some little distance in rear of said face-plate, leaving a sight-aperture and shaving-clearance, $l$, between said plate and cutter. The whole guide or shoe B is adjusted up or down, according to the width of the chamfer or molding to be made, by means of a screw, E, fitted to turn within and through a box-like projection, $m$, on the back of the guide; but it has no longitudinal movement therethrough, being restrained by cross-pins $n\ n$ or otherwise, and it screws at its lower end portion within or through the part $r$ of the stock, and may be steadied below by a side set-screw, $s$, Fig. 5. The upper end of said screw is fitted with a knob or head, $a'$, which bears down on a knob or head, $b'$, of a second screw, G, made hollow and receiving the shank of the screw E through it. This second screw, G, works through a nut, $c'$, which has connected with it, by side pin or pins and slot or slots, $s'$, a yoke, $d'$, pivoted, as $e'$, to the box-like projection $m$ on the guide B, and fitting at its outer end in any one of a series of holes, $f'$, in the cutter, whereby on turning the screw G by its head $b'$ the cutter may be raised or lowered to especially adjust its amount of cut. Its general adjustment, as wear may require, is provided for by changing the fit of the yoke $d'$ from one of the holes $f'$ to another. The concentric arrangement of the two screws E and G the one within and through the other is very compact and convenient for separately adjusting the guide or shoe B and the cutter C, carried by said guide. The cutter C is held to its place on the back of the guide B and in engagement with the adjusting device or yoke $d'$ with facility for disengagement and removal, when required, by means of a front plate or arm, H, in slotted pivoted side connection at $g'\ g'$ with the guide or shoe B, and a locking arm or eccentric, I, pivoted at $h'$ on the upper end of said arm, and having its handle $h^2$ arranged to shut down out of the way, said cam bearing, when closed, against a flexible strip or spring, $i'$, attached at its one end to the arm H and lying at its other end on the cutter. On the front top portion of the stock A is a handle, J, for one hand of the workman to hold, while his other takes hold of the back portion of the plane to guide and work the tool.

In using the plane to make a stop-chamfer or stop rule-joint or other stop molding, the cut is made direct from where the chamfer or molding, as at $l'$, Fig. 8, stops on the wood, the plane being pressed and held thereon with the sides of its longitudinal base groove $c$ resting on or against the two adjacent longitudinal marginal portions of the piece of wood, and the cutter C, by the manipulation of the plane, made to enter the wood at $l'$, or where the chamfer or molding is designed to stop, the clearance-aperture $l$ in front of the cutter enabling the operator to see the exact place at which he should start. The plane is then worked forward away from such starting-point, and the operation repeated till the wood has been sufficiently reduced to make the necessary chamfer or molding, the operator always starting from the same place and pressing down on the plane, which receives within the angular groove $c$ of its base, in rear of the cutter, the correspondingly-shaped base or stopped part of the work, which groove provides for the starting of the chamfering or molding at any point in the length of the strip or piece of wood, and for making a stop chamfer or molding without any chiseling or other cutting than that done by the plane in making the chamfer or molding.

Having thus described my invention, what I claim as new, and desire to secure by Letters Patent, is—

1. The combination, with the stock A, having an oblique opening, $b$, up through it, and a longitudinal angular recess or groove, $c$, in its base, shaped to conform to the adjacent longitudinal marginal portions of the wood to be worked, of the guide and cutter-holder B, having a lower face-piece made to conform to the shape of the chamfer or molding to be produced, and adjustable along with the cutter, of like shape on its cutting-edge, down through said oblique opening and into the longitudinal angular groove $c$, which it crosses, substantially as and for the purposes herein set forth.

2. The removable guiding face piece or plate $f$, in combination with the adjustable guide or shoe B and the separately-adjustable cutter C, carried by said guide or shoe, essentially as shown and described.

3. The screws E and G, arranged to pass longitudinally one through the other, in combination with the stock A, the guide or shoe B, and the cutter C, for separate and collective adjustment of said guide or shoe and cutter, substantially as specified.

RICHARD VANWIKE WICKS.

Witnesses:
A. GREGORY,
C. SEDGWICK.